US008964376B2

(12) United States Patent
Chen et al.

(10) Patent No.: US 8,964,376 B2
(45) Date of Patent: Feb. 24, 2015

(54) HANDLE ATTACHMENT (75) Inventors: Eric Chen, Houston, TX (US); Memphis-Zhihong Yin, Tomball, TX (US); Dustin L. Hoffman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/260,373

(22) PCT Filed: Jan. 26, 2010

(86) PCT No.: PCT/US2010/022104
§ 371 (c)(1),
(2), (4) Date: Sep. 25, 2011

(87) PCT Pub. No.: WO2011/093853
PCT Pub. Date: Aug. 4, 2011

(65) Prior Publication Data
US 2012/0020019 A1    Jan. 26, 2012

(51) Int. Cl.
H05K 5/00        (2006.01)
H05K 7/00        (2006.01)
A47B 96/06       (2006.01)
G06F 1/16        (2006.01)

(52) U.S. Cl.
CPC .............. G06F 1/166 (2013.01); G06F 1/1656 (2013.01)
USPC ............ 361/679.55; 361/679.56; 361/679.57; 361/679.58; 361/679.59; 361/679.27; 292/169.17

(58) Field of Classification Search
USPC ............... 361/679.55–679.59, 679.21–679.3, 361/679.01–679.09, 679.1–679.19, 361/679.21–679.29, 679.31–679.45, 361/679.55–679.6, 724–747; 455/575.1, 455/575.3, 575.4, 575.8, 325, 556.1, 550.1, 455/90.1; 292/1–62, 113, 169.11–169.23, 292/341.11–341.19; 248/917–924, 80–88, 248/155.1–155.5, 166–173, 180.1–186.2, 248/229.1–231.51, 271.4, 292.14, 248/316.1–316.8
See application file for complete search history.

(56) References Cited

U.S. PATENT DOCUMENTS

| | | | |
|---|---|---|---|
| 5,150,222 A * | 9/1992 | Nakayama | 358/400 |
| 5,479,678 A * | 1/1996 | Reed et al. | 16/325 |
| 5,596,482 A | 1/1997 | Horikoshi | |
| 5,818,360 A | 10/1998 | Chu | |
| 6,008,983 A | 12/1999 | Yen | |
| 6,442,018 B1 | 8/2002 | Dinkin | |
| 2002/0008790 A1* | 1/2002 | Tajima | 349/2 |
| 2004/0010889 A1 | 1/2004 | Chen | |
| 2005/0006212 A1* | 1/2005 | Han et al. | 200/61.7 |
| 2006/0034045 A1 | 2/2006 | Wang | |
| 2006/0064850 A1 | 3/2006 | Sato et al. | |
| 2006/0104020 A1* | 5/2006 | Fan et al. | 361/683 |
| 2006/0196235 A1 | 9/2006 | Fan et al. | |
| 2006/0207775 A1* | 9/2006 | Armstrong | 173/1 |

OTHER PUBLICATIONS

ISA/KR, International Search Report dated Oct. 25, 2010, PCT/US2010/022104 filed Jan. 26, 2010.

* cited by examiner

Primary Examiner — Jerry Wu
(74) Attorney, Agent, or Firm — Hewlett-Packard Patent Department; Chun-Liang Kuo (57) ABSTRACT

A handle attachment including a mounting mechanism configured to couple the handle attachment to a computing machine and a clutch mechanism configured to reposition the handle attachment and lock the handle attachment in at least one position from the computing machine.

21 Claims, 7 Drawing Sheets

HANDLE ATTACHMENT

CROSS-REFERENCE TO RELATED APPLICATION

This application is a national stage application under 35 U.S.C. §371 of PCT/US2010/022104, filed Jan. 26, 2010.

BACKGROUND

When transporting a computing machine, a user can manually grasp at least one edge of the computing device. Once an edge has been grasped, the user can proceed to lift and move the computing machine. Additionally, the user can insert the computing machine in a carrying case and proceed to utilize the carrying case when transporting the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1:
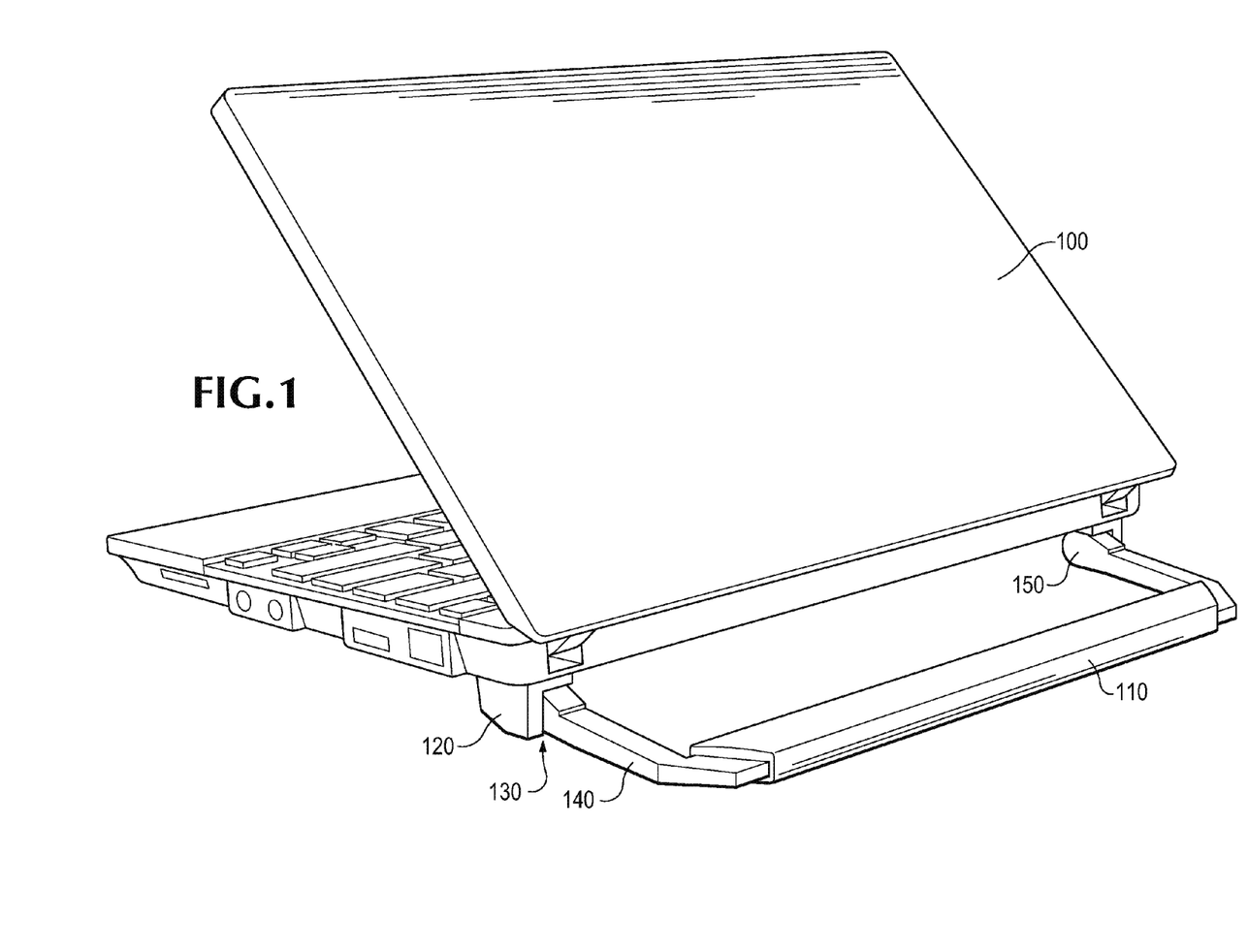
FIG. 1 illustrates a handle attachment coupled to a computing machine according to an embodiment of the invention.

FIG. 1 illustrates a handle attachment 110 coupled to a computing machine 100 according to an embodiment of the invention. As illustrated in FIG. 1, the handle attachment 110 includes at least one mounting mechanism 120 and at least one clutch mechanism 130. In other embodiments, the handle attachment 110 can include or be coupled 10 additional devices and/or components in addition to and/or in lieu of those noted above and as illustrated in FIG. 1.

A handle attachment 110 is a device which a user can hold and/or operate to access and/or transport a computing machine 100. In one embodiment, the user can hold and/or operate the handle attachment 110 by physically grasping and holding the handle attachment 110. The computing machine 100 can be a notebook, a netbook, and/or any computing device which the handle attachment 110 can be coupled to.

Additionally, the handle attachment 110 can be configured to reposition into at least one position and/or elevate at least one end of the computing machine 100 into one or more ergonomic positions. For the purposes of this application, the handle attachment 110 can reposition into at least one of the positions by sliding along and/or rotating around one or more axis. In one embodiment, the user can cause the handle attachment 110 to reposition by applying force to the handle attachment 110 in one or more directions.

Additionally, a composition of the handle attachment 110 can include one or more alloys, one or more plastics, and/or a combination of the above. In other embodiments, a composition of the handle attachment 110 can include additional compounds and/or a combination of compounds.

As illustrated in FIG. 1, in one embodiment, the handle attachment 110 includes a first end 140 and a second end 150. The first end 140 of the handle attachment 110 and the second end 150 of the handle attachment 110 can be coupled to a base of the computing machine 100 through at least one mounting mechanism 120. Additionally, when the first end 140 of the handle attachment 110 and the second end 150 of the handle attachment 110 couple to at least one of the mounting mechanisms 120, at least one clutch mechanism 130 can engage the handle attachment 210 and at least one of the mounting mechanisms 120.

Figure 2A:
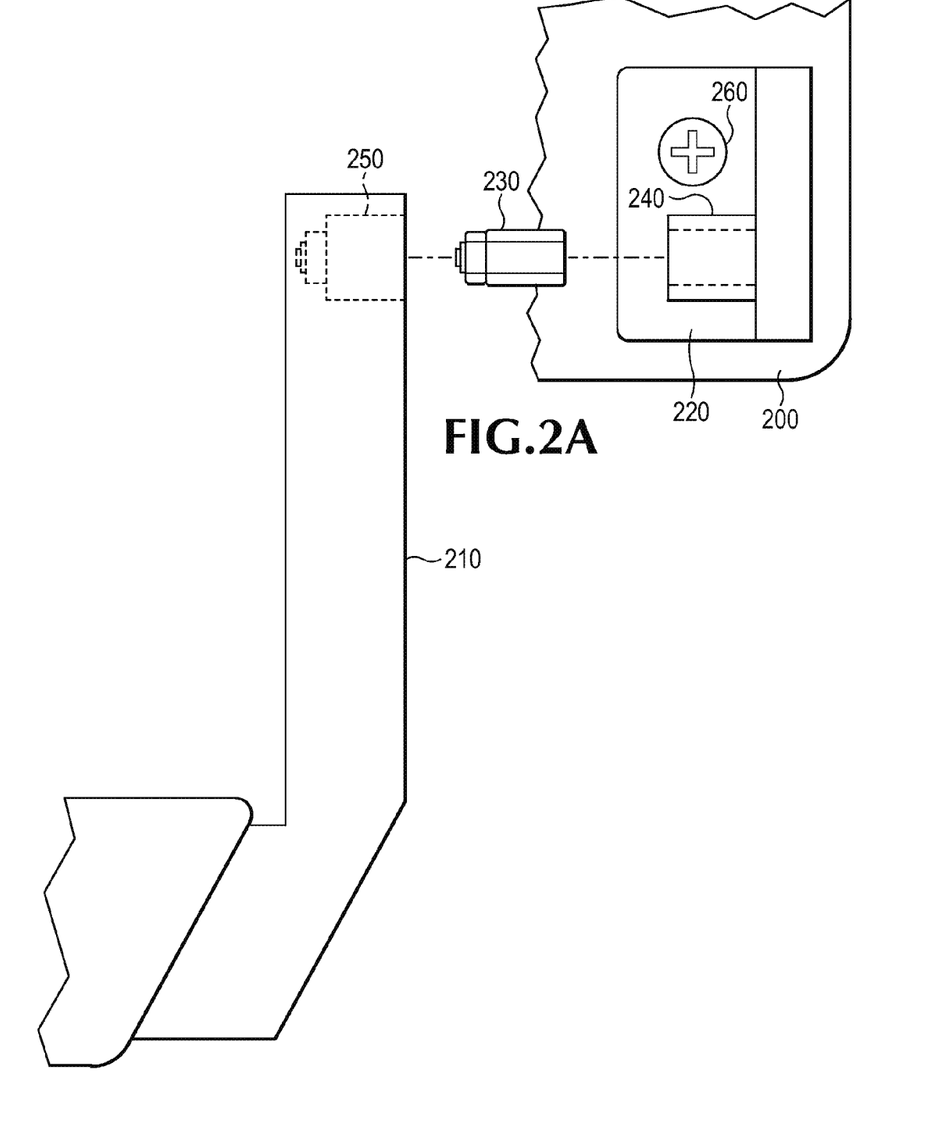
FIG. 2A illustrates a mounting mechanism configured to couple a handle attachment to a computing machine according to an embodiment of the invention.

FIG. 2A illustrates at least one mounting mechanism 220 configured to couple a handle attachment 210 to a computing machine 200 according to an embodiment of the invention. A mounting mechanism 220 is a component which can be coupled to and/or secured to the computing machine 200. Additionally, as noted above, a mounting mechanism 220 can engage the handle attachment 210 and couple the handle attachment 210 to the computing machine 200.

As shown in FIG. 2A, in one embodiment, at least one of the mounting mechanisms 220 can be coupled to a base of the computing machine 200. In another embodiment, at least one of the mounting mechanisms 200 can be coupled to one or more side positions on the computing machine 200. In other embodiments, at least one of the mounting mechanisms 220 can be coupled to additional locations or positions on the computing machine 200.

Further, at least one of the mounting mechanisms 220 can be coupled and/or secured to at least one location or position on the computing machine 200 utilizing at least one fastening device 260. As illustrated in FIG. 2, in one embodiment, at least one of the fastening devices 260 can include a screw. In another embodiment, at least one of the fastening devices 260 can include a latch, and/or a clamp. In other embodiments, additional devices and/or components can be used to secure the mounting mechanism 220 to the computing machine 200.

As illustrated in FIG. 2A, a mounting mechanism 220 can include a module 240. As shown in FIG. 2A, the module 240 protrudes from the mounting mechanism 220 and is configured to engage an aperture 250 on an end of the handle attachment 210 when coupling to the handle attachment 210. In one embodiment, the module 240 engages the aperture 250 on the handle attachment 210 by sliding into the aperture 250. By engaging the module 240 into the aperture 250 and coupling the mounting mechanism 220 to the computing machine 200, the handle attachment 210 can be securely coupled to the computing machine 200.

Additionally, a shape of the module 240 and the shape of the aperture 250 can be round. As a result, when the module 240 of the mounting mechanism 220 engages the aperture 250 of the handle attachment, the handle attachment 210 can be configured to rotate along and/or around the module 240. In other embodiments, the shape of the aperture 250 and the module 240 can include different shapes and/or sizes in addition to and/or in lieu of those noted above and illustrated in FIG. 2A.

Further, as illustrated in FIG. 2A, in one embodiment, the module 240 of the mounting mechanism 220 can include an aperture. As noted above and as illustrated in FIG. 2A, when the module 240 of the mounting mechanism 220 engages the aperture 250 of the handle attachment 210, a clutch mechanism 230 can be configured to engage the aperture of the module 240 on the mounting mechanism 220 and engage the aperture 250 of an end of the handle attachment 210.

Figure 2B:
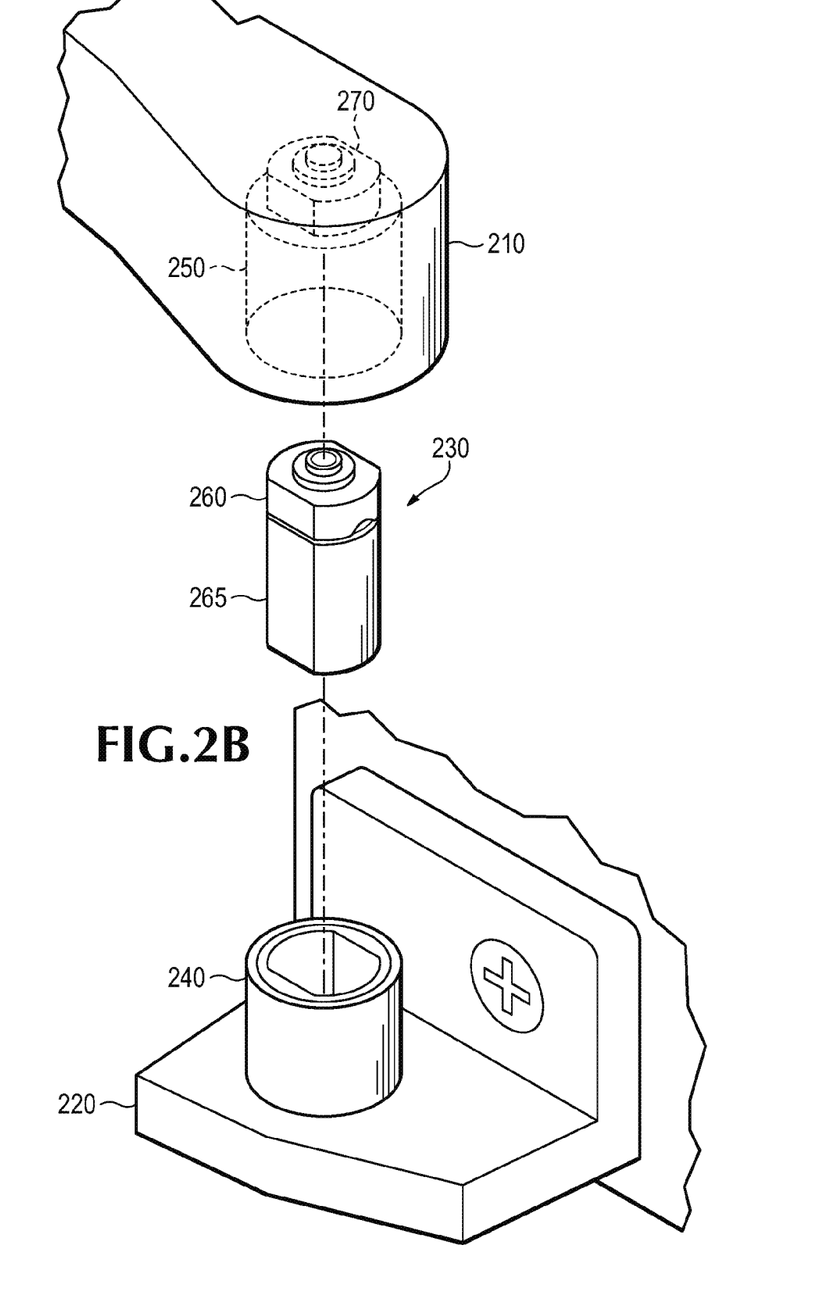
FIG. 2B illustrates a clutch mechanism engaging a handle attachment and a mounting mechanism according to an embodiment of the invention.

FIG. 2B illustrates a clutch mechanism 230 engaging a handle attachment 210 and a mounting mechanism 220 according to an embodiment of the invention. A clutch mechanism 230 is a device configured to reposition as a handle attachment 210 repositions. Additionally, the clutch mechanism 230 is configured to lock the handle attachment 210 in one or more positions.

As illustrated in FIG. 2B, when coupled to the handle attachment 210 and at least one mounting mechanism 220, the clutch mechanism 230 engages an aperture on a module 240 of the mounting mechanism 220 and an aperture 250 on an end of the handle attachment 210.

In one embodiment, as illustrated in FIG. 2B, the clutch mechanism 230 includes a first portion 260 and a second portion 265. Additionally, as illustrated in the present embodiment, one or more sides of the first portion 260 and the second portion 265 of the clutch mechanism 230 can be flat. As a result, the first portion 260 and the second portion 265 of the clutch mechanism 230 can securely engage and couple with the aperture 250 of an end of the handle attachment 210 and an aperture of the module 240 on the mounting mechanism 220.

As shown in FIG. 2B, the second portion 265 of the clutch mechanism 230 can engage the aperture of the module 240 on the mounting mechanism 230 by sliding into the aperture. As illustrated in FIG. 2B, a shape of the aperture of the module 240 includes at least one flat side and matches the shape and size of the second portion 265 of the clutch mechanism 230. Additionally, a depth of the aperture of the module 240 matches a height of the second portion 265 of the clutch mechanism 230.

As a result, when the second portion 265 of the clutch mechanism 230 engages the aperture of the module 250 on the mounting mechanism 230, the second portion 265 of the clutch mechanism 230 is securely coupled to the mounting mechanism 220 and the first portion 260 of the clutch mechanism 230 can protrude out from the aperture of the module 250.

By securely coupling the second portion 265 of the clutch mechanism 230 to the mounting mechanism 220, movement of the second portion 265 of the mounting mechanism 230 can be secured and/or restricted. In one embodiment, securing and/or restricting movement of the second portion 265 includes restricting the second portion 265 from repositioning along and/or rotating around one or more axis.

As noted above, the module 240 of the mounting mechanism 220 can engage and/or couple to an aperture on the handle attachment 210. When engaging and coupling the module 240 to the aperture 250 of the handle attachment 210, the first portion 260 of the clutch mechanism 230 can protrude above the aperture 250 of the module 240 and engage an indention 270 within the aperture 250 of the handle attachment 210.

As illustrated in FIG. 2B, a size and shape of the indention 270 can match a size and/or be of a slightly large size of the first portion 260 of the clutch mechanism 230. In one embodiment, as illustrated in FIG. 2B, one or more sides of the first portion of the clutch mechanism 230 are flat and one or more sides of the indention 270 within the aperture 250 are also flat.

As a result, when the module 240 on the mounting mechanism 220 engages the aperture 250, the first portion 260 of the clutch mechanism 230 can securely engage and couple with the aperture 250 on the handle attachment 210.

As noted above, the clutch mechanism 230 is configured to reposition as the handle attachment 210 repositions to and/or from at least one position from the computing machine 100. Additionally, the clutch mechanism 230 is configured to lock the handle attachment 210 in at least one of the positions when repositioning. In one embodiment, locking the handle attachment 210 in at least one of the positions includes restricting movement of the handle attachment 210 such that the handle attachment 210 remains stationary while in a position.

When the handle attachment 210 repositions into one or more positions, the second portion 265 of the clutch mechanism 230 can remain stationary while the first portion 260 of the clutch mechanism 230 repositions by rotating. Additionally, as the first portion 260 of the clutch mechanism 230 repositions, the first portion 260 can be configured to lock into one or more of the positions. Further, the first portion 260 can be configured to unlock from one or more of the positions as the handle attachment 210 repositions from one or more of the positions. As a result, the handle attachment 210 can be configured to reposition and lock into one or more positions.

Figure 3A:
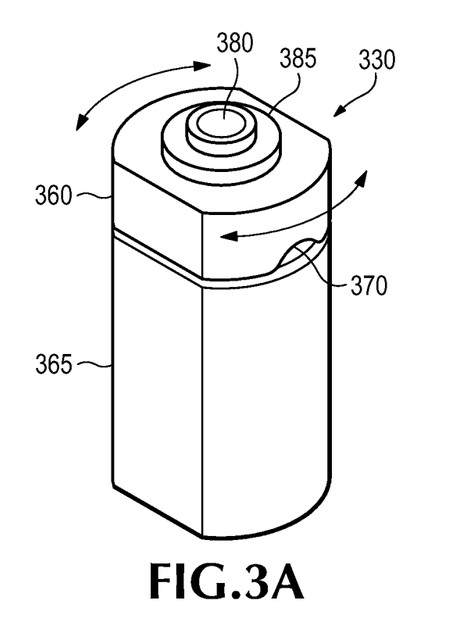
FIG. 3A and FIG. 3B illustrate a clutch mechanism according to an embodiment of the invention.
Figure 3B:
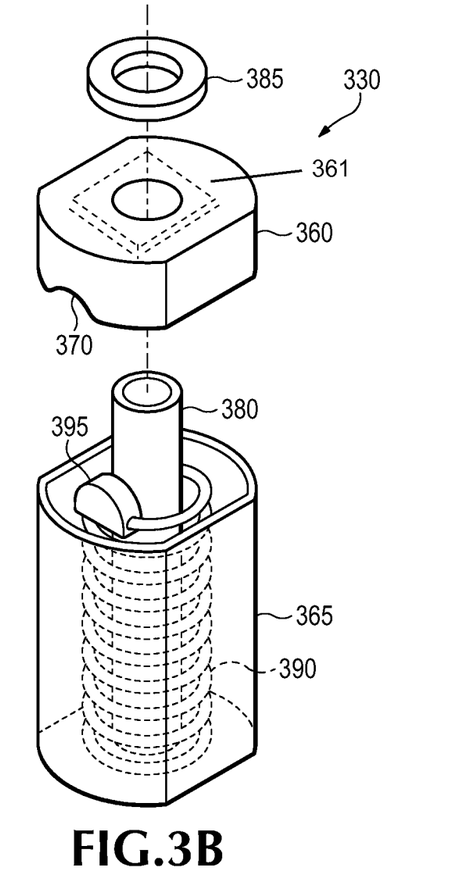

FIG. 3A and FIG. 3B illustrate a clutch mechanism 330 according to an embodiment of the invention. For the purposes of this application, FIG. 3A represents a first side view of the clutch mechanism 330. Additionally, FIG. 3B represents an opposite side view of the clutch mechanism 330 and an exploded view of the clutch mechanism 330.

As shown in FIG. 3A and FIG. 3B, the clutch mechanism 330 includes a center cylinder 380. The center cylinder 380 is a component which couples the first portion 360 of the clutch mechanism 330 to the second portion 365 of the clutch mechanism 330. Additionally, the center cylinder 380 allows the first portion 360 of the clutch mechanism 330 to rotate along an axis. When rotating along an axis, the first portion 360 can rotate around the center cylinder 380.

As illustrated in FIG. 3B, in one embodiment, the center cylinder 380 is coupled to a plate within the bottom portion 365 of the clutch mechanism 330. Additionally, as shown in FIG. 3B, the first portion 360 of the clutch mechanism 330 includes an orifice at the center of the first portion 360. The orifice at the center of the first portion 360 is configured to engage the center cylinder 380 and couples the first portion 360 of the clutch mechanism 330 to the second portion 365 of the clutch mechanism 330. In addition, in one embodiment, as illustrated in FIG. 3A and FIG. 3B, a coupling device 385 can couple and secure the center cylinder 380 to the first portion 360 of the clutch mechanism 330.

As noted above and as illustrated in FIG. 3A and FIG. 3B, when the center cylinder 380 engages the orifice of the first portion 360, the first portion 360 can be configured to rotate in one or more directions around and/or along an axis. The first portion 365 of the clutch mechanism 330 can be configured to rotate in response to a handle attachment repositioning along and/or around one or more axes. Additionally, as noted above, the handle attachment can reposition by sliding along an axis. In another embodiment, the handle attachment reposition by rotating around an axis.

When rotating along an axis, the first portion 360 of the clutch mechanism 330 can rotate along the center cylinder 380. In another embodiment, when rotating along an axis, the first portion 360 and the center cylinder 380 can both be configured to rotate. In one embodiment, the first portion 360 of the clutch mechanism 330 includes a motor 361 and the first portion 360 of the clutch mechanism 330 is configured by the motor 361 to automatically rotate along and/or around an axis in response to a user accessing the handle attachment.

Further, the handle attachment can include one or more sensors which can detect when a user is accessing the handle attachment and communicate the information to the motor of the clutch mechanism. One or more sensors can include a biometric device, an infrared device, and/or a proximity sensor. In other embodiments, one or more sensors can include additional devices configured to determine whether a user is accessing the handle attachment in addition to and/or in lieu of those noted above.

Additionally, as noted above and as illustrated in FIG. 3A and FIG. 3B, the first portion 360 of the clutch mechanism 330 and a handle attachment can be configured to lock into one or more positions when repositioning. When locked into one or more of the positions, an indention 370 on the first portion 360 of the clutch mechanism 330 engages an indention component 395. An indention 370 is configured to be engaged by an indention component 395 when restricting movement of the first portion 360 and locking the first portion 370 in a position. As a result, the indention 370 is configured to be engaged by the indention component 395 when locking the handle attachment in one or more positions.

Further, as noted above, the first portion 360 and the handle attachment can be configured to unlock from one or more of the positions when repositioning. In one embodiment, when unlocking from one or more of the positions, force can be applied to the handle attachment by a user in one or more directions. As force is applied to the handle attachment, force is also applied to the first portion 360 and the first portion 360 of the of the clutch mechanism 330 is configured to rotate. In one embodiment, applying rotational force to the first portion 360 results in force being applied to the indention component 395 and causes the indention component 395 to retract from an indention 370 and unlock the handle attachment from a position.

As illustrated in FIG. 3A and FIG. 3B, the first portion 360 of the clutch mechanism 330 includes one or more indentions 370. In one embodiment, when repositioning, the first portion 360 rotates and one or more of the indentions become aligned over the component 395. As shown in FIG. 3A and FIG. 3B, one or more of the indentions 370 are located on a base of the first portion 360 of the clutch mechanism 330. Additionally, one or more of the indentions 370 can be located at one or more locations and/or sides of the first portion 360.

In one embodiment, one or more of the indentions 370 are located at the base of the first portion 360 and are positioned at opposite sides on the first portion 360. In other embodiments, the first portion 360 of the clutch mechanism 330 can include additional indentions 370 and the indentions 370 can be located at additional locations in addition to and/or in lieu of those noted above and illustrated in FIG. 3A and FIG. 3B.

As noted above, an indention component 395 can be configured to engage one of the indentions 370 when locking the first portion 360 and the handle attachment in one or more positions. As illustrated in FIG. 3B, a size and a shape of the indention component 395 can enter and engage one or more of the indentions 370. In one embodiment, a shape of the indention component 395 can be round. Additionally, as illustrated in FIG. 3B, the indention component 395 is coupled to a top of a spring 390. In other embodiments, the indention component 395 can be coupled to additional locations in addition to and/or in lieu of those noted above and illustrated in FIG. 3B.

As shown in FIG. 3B, a spring 390 coupled to the indention component 395 coils around the center cylinder 380. The spring 390 can be configured to retract the indention component 395 as the handle attachment and the first portion 360 of the clutch mechanism 330 unlock, reposition and/or transition between one or more of the indentions 370. Additionally, the spring 390 can be configured to extend the indention component 395 as the indention component 395 becomes aligned below an indention 370 to engage the indention 370 and lock the first portion 360 and the handle attachment in one or more positions.

In one embodiment, the spring 390 can be coupled to a base of the second portion 365 of the clutch mechanism. In another embodiment, the spring 390 can be coupled to the center cylinder 380. In other embodiments, the spring 395 can be coupled to additional locations or positions on the clutch mechanism 330 in addition to and/or in lieu of those noted above and illustrated in FIG. 3B.

In one embodiment, the spring 390 can be coupled to a base of the second portion 365 of the clutch mechanism. In another embodiment, the spring 390 can be coupled to the center cylinder 380. In other embodiments, the spring 395 can be coupled to additional locations or positions on the clutch mechanism 330 in addition to and/or in lieu of those noted above and illustrated in FIG. 3B.

In one embodiment, the spring 390 can be coupled to a motor included in the clutch mechanism 330. The motor can apply and/or reduce an amount of force applied to the spring 390. As a result, the spring 390 can automatically compress and/or expand while the first portion 360 of the clutch mechanism 330 rotates along an axis.

Figure 4A:
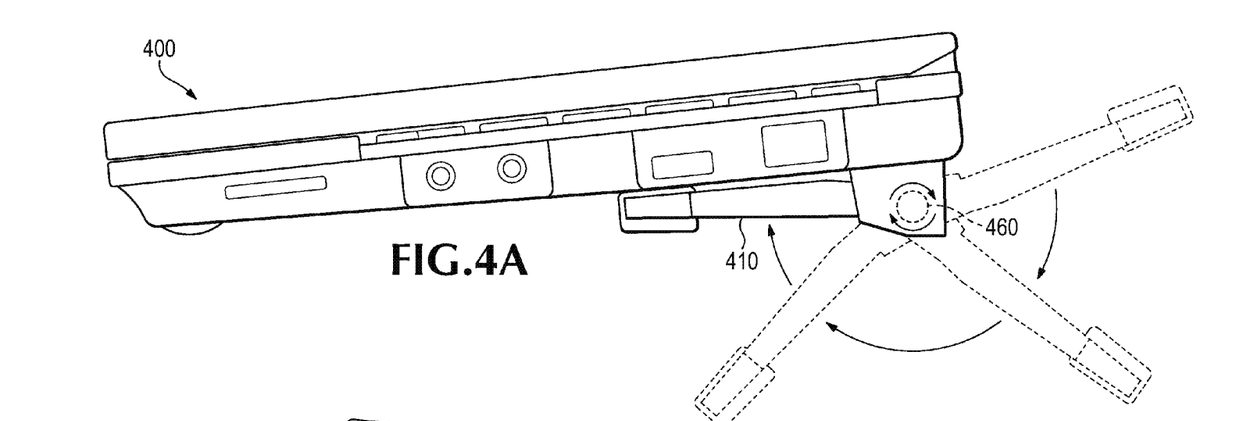
FIG. 4A and FIG. 4B illustrate a handle attachment repositioning and locking into at least one position according to an embodiment of the invention.
Figure 4B:
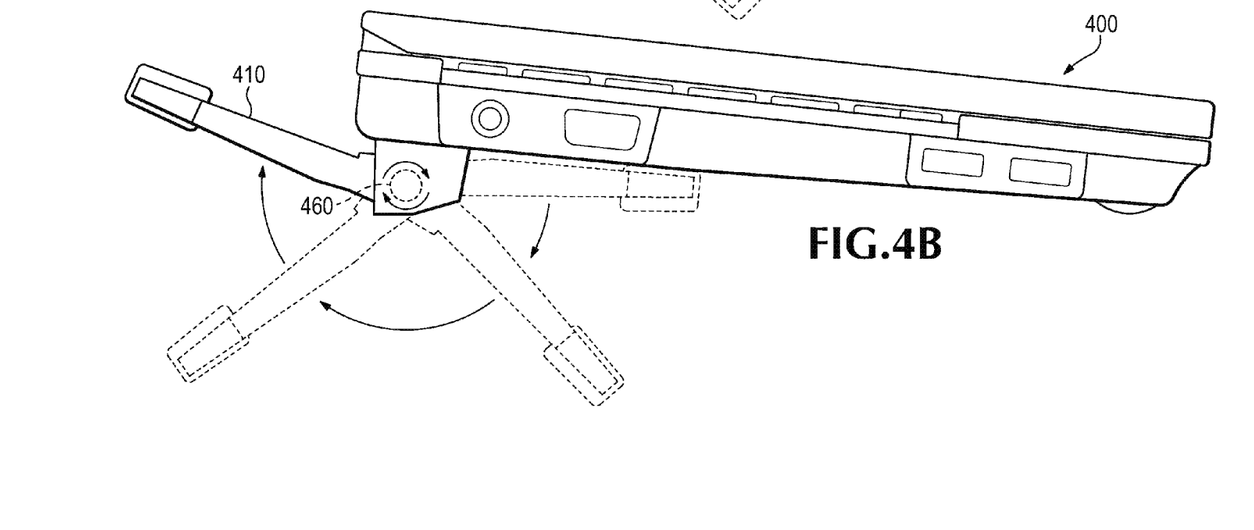

FIG. 4A and FIG. 4B illustrate a handle attachment 410 repositioning and locking into at least one position according to an embodiment of the invention. For the purposes of this application, FIG. 4A represents a view of the handle attachment 410 repositioning in a direction and locking into one or more positions. Additionally, FIG. 4B represents a flipped view and the handle attachment 410 repositioning in an opposite direction and locking into one or more positions.

As noted above, the handle attachment 410 can reposition in response to a user accessing the handle attachment 410. Additionally, as illustrated in FIG. 4, the handle attachment 410 can reposition and lock into one or more positions by rotating around and/or along one or more axis. Further, as noted above, as the handle attachment 410 repositions, a first portion 460 of a clutch mechanism can be configured to rotate and lock the handle attachment 410 in one or more positions.

As illustrated in FIG. 4A and FIG. 4B, one or more of the positions can include an open position, where the handle attachment 410 is extended from a computing machine 400. Additionally, one or more of the positions can include a closed position, when the handle attachment 410 is retracted to the computing machine 400. Further, one or more of the positions can include additional positions between the open and the dosed position. In other embodiments, the handle attachment 410 can rotate and lock into additional positions in addition to and/or in lieu of those noted above and illustrated in FIG. 4A and FIG. 4B.

As shown in FIG. 4A, the handle attachment 410 can initially be locked in an open position. As noted above, the handle attachment 410 can be locked into one or more positions when an indention component of the clutch mechanism engages one or more indentions on the first portion of the clutch mechanism.

As illustrated in FIG. 4A, the handle attachment 410 can be configured to reposition from an open position to a closed position by rotating around an axis. As noted above and as shown in FIG. 4A, as the handle attachment 410 rotates from the open position, the first portion 460 of the clutch mechanism also rotates around an axis. As the first portion 460 rotates, the indention component can be configured by a spring of the clutch mechanism to retract and unlock the handle attachment from the open position.

Additionally, as the first portion 460 continues to rotate, the indention component becomes aligned with one or more indentions on the first portion 460. When aligned with one or more of the indentions, the spring can expand to engage the indention component with an indention and lock the handle attachment 410 in the closed position.

Further, as illustrated in FIG. 4B, the handle attachment 410 can be configured to reposition from a closed position to an open position by rotating around an axis in an opposite direction. As noted above and as shown in FIG. 4A, as the handle attachment 410 unlocks from a position and rotates, the first portion 460 of the clutch mechanism also rotates around an axis. As the first portion 460 rotates, the indention component can be configured by a spring of the clutch mechanism 430 to retract when transitioning between one or more positions.

Once the indention component becomes aligned with another indention and the handle attachment 410, the spring of the clutch mechanism can expand to engage the indention component with an indention and lock the handle attachment 410 in an open position.

Figure 5:
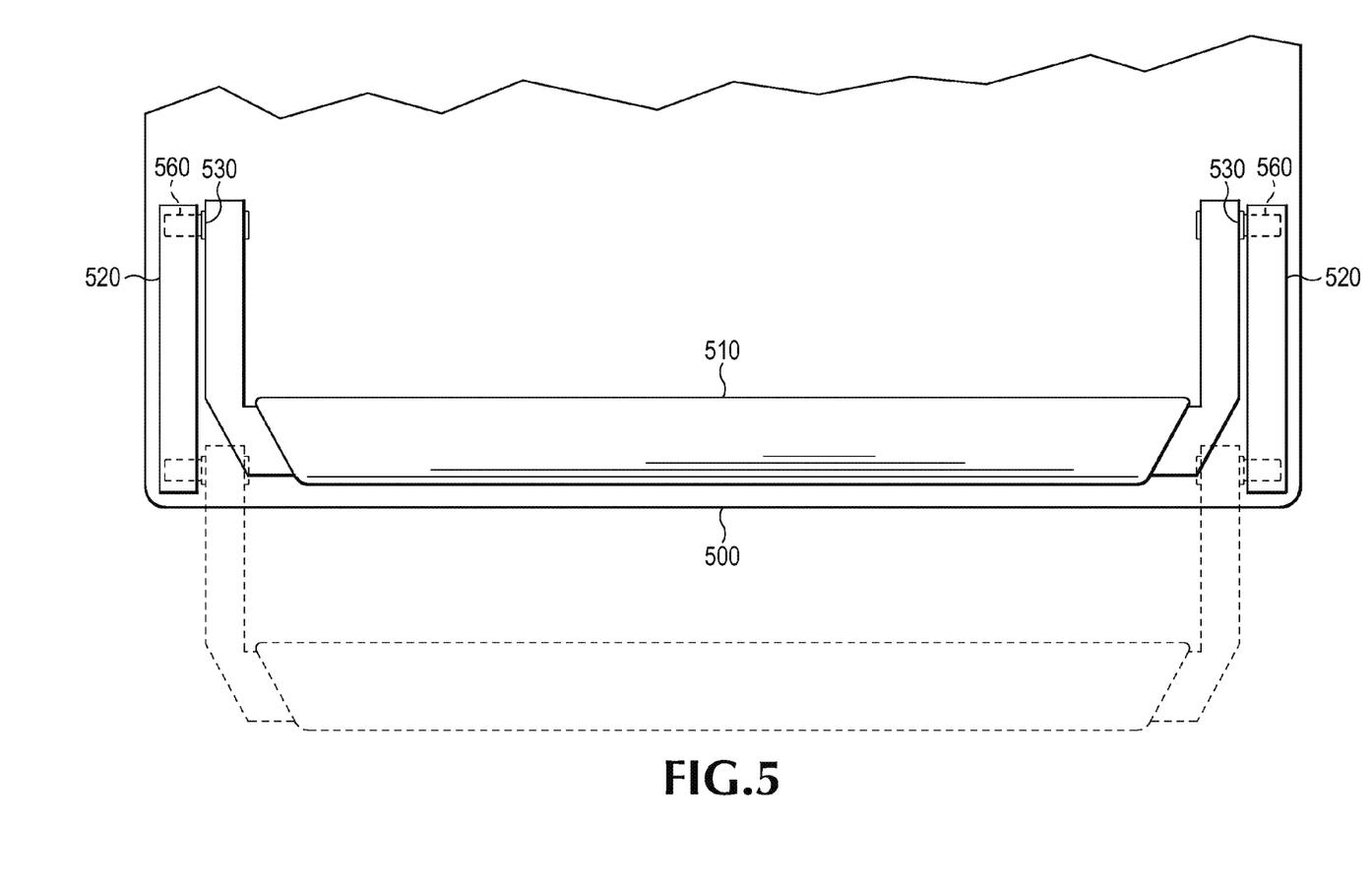
FIG. 5 illustrates a handle attachment repositioning and locking into at least one position according to another embodiment of the invention.

FIG. 5 illustrates a handle attachment 510 repositioning and locking into at least one position according to another embodiment of the invention. As noted above, in one embodiment, the handle attachment 510 can reposition by sliding along an axis. As illustrated in FIG. 5 and as noted above, the handle attachment 510 is coupled to a computing machine 500 through one or more mounting mechanisms 520. Additionally, as illustrated in FIG. 5, in one embodiment, one or more of the mounting mechanisms 520 includes one or more rails.

As illustrated in FIG. 5, one or more of the rails 520 can couple to a base of the computing machine 500. In another embodiment, one or more of the rails 520 can be coupled to both sides of the computing machine 500. In other embodiments, one or more of the rails 520 are coupled to additional locations and/or positions on the computing machine 500 in addition to and/or in lieu of those noted above and illustrated in FIG. 5.

As a result, the handle attachment 510 can be configured to reposition into at least one position by extending from and/or retracting to the computing machine 500. As noted above, a clutch mechanism 530 can be configured to reposition and lock the handle attachment 510 into one or more of the positions. Additionally, when repositioning, a first portion 560 of the clutch mechanism 530 can be configured to rotate as the handle attachment 510 repositions. Further, when locking into one or more positions, an indention component of the clutch mechanism 530 can be configured to extended from a spring of the clutch mechanism 530 and engage one or more indentions located on the first portion 560 of the clutch mechanism 530.

In one embodiment, as illustrated in FIG. 5, the handle attachment 510 is retracted to the computing machine 500 and is in a closed position. As the handle attachment 510 repositions by sliding along the rails 520, the first portion 560 of the clutch mechanism 530 rotates on the rails 520. As the first portion 560 rotates, the indention component can retract when transitioning between one or more of the indentions and then extend when aligned with one or more of the indentions.

As a result, by extending the indention component when aligned with one or more indentions, the first portion 560 and the handle attachment 510 can be configured to lock into one or more positions as the handle attachment 510 repositions. The handle attachment 510 can continue to reposition and lock into one or more positions when transitioning from a closed position to an open position or transitioning from an open position to a closed position.

Figure 6:
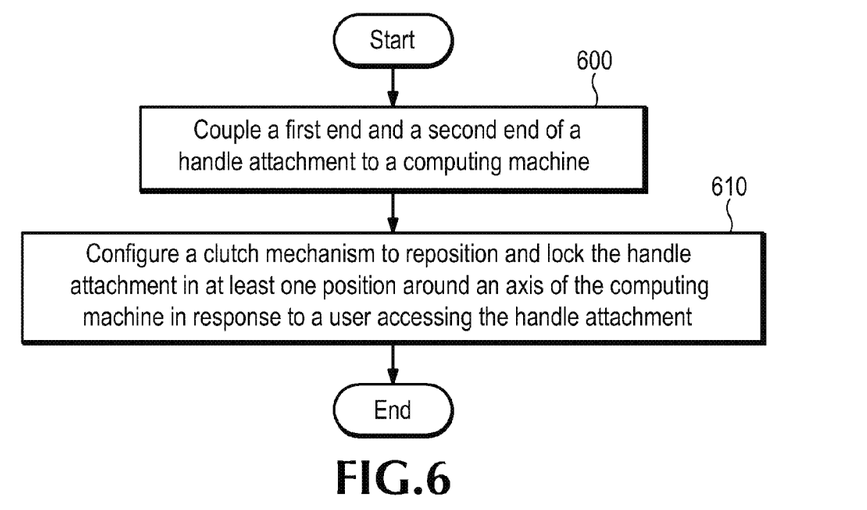
FIG. 6 is a flow chart illustrating a method for repositioning a handle attachment according to an embodiment of the invention.

FIG. 6 is a flow chart illustrating a method for repositioning a handle attachment according to an embodiment of the invention. The method of FIG. 6 uses a handle attachment, a computing machine, a mounting mechanism, and a clutch mechanism. In other embodiments, the method of FIG. 6 uses additional components and/or devices in addition to and/or in lieu of those noted above and illustrated in FIGS. 1, 2, 3, 4, and 5.

As noted above, a handle attachment is a device which a user can hold and/or operate to access and/or transport a computing machine. Additionally, the handle attachment can be configured to reposition into at least one position and/or elevate at least one end of the computing machine into one or more ergonomic positions.

Further, a first end and a second end of a handle attachment can be coupled to a computing machine 600. As noted above, at least one mounting mechanism can couple the handle attachment to the computing machine. In addition, at least one of the mounting mechanisms can be fastened to a base of the computing machine with a fastening device, such as a screw. In other embodiments, one or more of the mounting mechanisms can be fastened to additional locations or positions on the computing machine. As a result, the handle attachment can be coupled to additional location and/or positions on the computing machine in addition to and/or in lieu of those noted above.

Additionally, as noted above, a mounting mechanism can include a module which includes an aperture. The module can engage an aperture with an indention on one of the ends of the handle attachment when coupling to the handle attachment. As noted above, when the module of the mounting mechanism engages the aperture of the handle attachment, a clutch mechanism can engage the aperture of the module and the indention of the aperture on the handle attachment.

As noted above, the clutch mechanism includes a first portion and a second portion. The second portion can securely be inserted within the aperture of the module and movement of the second portion can be restricted. Additionally, the first portion of the clutch mechanism can protrude out from the aperture of the module and engage the indention within the handle attachment.

In response to a user accessing the handle attachment, the clutch mechanism can be configured to reposition and lock the handle attachment in at least one position around an axis of the computing machine 610. In one embodiment, the handle attachment and the clutch mechanism can be configured to unlock from one or more positions as the handle attachment repositions.

As noted above, as the handle attachment is repositioned, the first portion of the clutch mechanism is configured to rotate around an axis. Additionally, the first portion of the clutch mechanism includes one or more indentions configured to engage an indention component of the clutch mechanism.

As noted above, as first portion of the clutch mechanism repositions in response to force being applied to the handle attachment, the indention component can be configured by a spring of the clutch mechanism to retract when unlocking and/or transitioning between one or more of the indentions. Additionally, the spring can expand and extend the indention component when aligned with one of the indentions. By expanding when aligned an indention, the indention component can engage the indention and lock the first portion in one or more positions.

As a result, by locking the first portion into one or more positions, the handle attachment can be configured to lock into one or more positions. In one embodiment, the method is then complete. In other embodiments, the method of FIG. 6 includes additional steps in addition to and/or in lieu of those depicted in FIG. 6.

Figure 7:
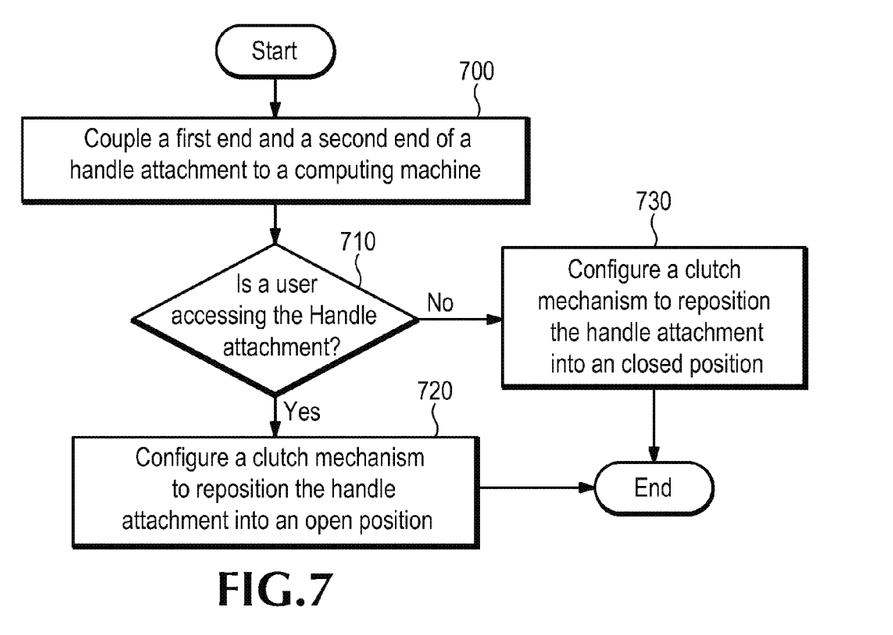
FIG. 7 is a flow chart illustrating a method for repositioning a handle attachment according to another embodiment of the invention.

FIG. 7 is a flow chart illustrating a method for repositioning a handle attachment according to another embodiment of the invention. Similar to the method disclosed above, the method of FIG. 7 uses a handle attachment, a computing machine, a mounting mechanism, and a clutch mechanism. In other embodiments, the method of FIG. 7 uses additional components and/or devices in addition to and/or in lieu of those noted above and illustrated in FIGS. 1, 2, 3, 4, and 5.

As noted above, a first end and a second end of a handle attachment can initially be coupled to a computing machine 700. Additionally, at least one mounting mechanism can be utilized to couple the first end and the second end of the handle attachment to the computing machine. When coupling to the computing machine, a mounting device can be fastened to one or more locations or positions on the computing machine with a fastening device.

Additionally, the mounting mechanism can couple one or more ends of the handle attachment to the mounting mechanism by engaging a module of the mounting mechanism into an aperture of an end of the handle attachment. As noted above, a shape of the module and the aperture can be round as to allow the aperture and the handle attachment to rotate around the module when the handle attachment is repositioning.

Further, the module of the mounting mechanism also includes an aperture. The aperture in the module of the mounting mechanism is of a size and a shape that a second portion of a clutch mechanism can securely engage it. In addition, an indention within the aperture on the handle attachment is also of a size a shape that securely engages a first portion of the clutch mechanism.

As noted above, a clutch mechanism is a device which has a first portion and a second portion. Additionally, the first portion of the clutch mechanism is configured to rotate in response to the handle attachment repositioning. Further the first portion of the clutch mechanism can lock into one or more positions and cause the handle attachment to lock into one or more positions. In addition, the first portion can unlock from a position when the handle attachment is repositioning to and/or from one or more positions.

When the module of the mounting mechanism engages the aperture of the handle attachment, the first portion of the clutch mechanism can engage an indention in the aperture of the handle attachment and the second portion of the clutch mechanism can engage the aperture in the module of the mounting mechanism.

In one embodiment, the clutch mechanism can include one or more motors and the handle attachment can include one or more sensors to detect whether a user is accessing the handle attachment 710. If a sensor detects a user is accessing the handle attachment, the sensor can communicate the information to the motor of the clutch mechanism for the clutch mechanism to reposition the handle attachment into an open position 720.

As noted above, as the handle attachment repositions, the first portion of the clutch mechanism can rotate. Additionally, as the first portion rotates, an indention component can engage one or more indentions on the first portion to lock the first portion and the handle attachment in one or more positions. As a result, once the handle attachment has reached the open position, the handle attachment can be locked into the open position by configuring the indention component to engage an indention.

In another embodiment, if one or more sensors do not detect a user accessing the handle attachment, the motor of the clutch mechanism can rotate the first portion of the clutch mechanism until the handle attachment repositions into a closed position 730. The method is then complete. In other embodiments, the method of FIG. 7 includes additional steps in addition to and/or in lieu of those depicted in FIG. 7.

By coupling a handle attachment onto a computing machine, the handle attachment can conveniently be utilized by a user to securely move the computing machine to other locations. Additionally, by utilizing a clutch mechanism to reposition and lock the handle attachment into at least one position, the handle attachment can be utilized to elevate and position the computing machine into a more ergonomic and a user friendly position.

What is claimed is:

1. A computing machine comprising:
   a handle attachment;
   a first end mounting mechanism and a second end mounting mechanism configured to couple a first end and a second end of the handle attachment to a base of the computing machine; and
   a clutch mechanism configured to rotate and selectively lock the handle attachment at a plurality of positions with respect to the computing machine, the clutch mechanism including:
   indentations corresponding to the plurality of positions,
   an indentation component engageable with the indentations to selectively lock the handle attachment at the corresponding plurality of positions, and
   a first portion rotatable with rotation of the handle attachment, and
   a second portion engaged to one of the first end and second end mounting mechanisms and including a housing and being non-rotatable while the first portion rotates, and the second portion further including a shaft protruding from a bottom wall of an inner chamber of the housing and extending from the inner chamber to protrude through a spring having an end portion engaged with the indentation component that is located radially away from a longitudinal axis of the shaft,
   wherein the first portion includes an orifice to rotatably engage the shaft.

2. The computing machine of claim 1, wherein the first end and the second end mounting mechanisms comprise rails along which the handle attachment is slideable.

3. The computing machine of claim 1, wherein the clutch mechanism includes a motor configured to rotate and lock the handle attachment in at least one of the plurality of positions in response to a user accessing the handle attachment.

4. The computing machine of claim 1, wherein the first end of the handle attachment and the second end of the handle attachment include apertures to couple respectively with the first end mounting mechanism and the second end mounting mechanism.

5. The computing machine of claim 4, wherein the first end mounting mechanism and the second end mounting mechanism include modules configured to engage the apertures of the first end of the handle attachment and the second end of the handle attachment.

6. The computing machine of claim 5, wherein the clutch mechanism couples the module of one of the first end and second end mounting mechanisms to the respective aperture of the handle attachment.

7. A method for repositioning a handle attachment comprising: coupling a first end and a second end of the handle attachment to a computing machine; providing a mounting mechanism to couple the handle attachment to the computing machine; and configuring a clutch mechanism to rotate and selectively lock the handle attachment at a plurality of positions, the clutch mechanism to rotate the handle attachment around an axis on the computing machine in response to a user accessing the handle attachment, the clutch mechanism including:
- indentations corresponding to the plurality of positions,
- an indentation component engageable with the indentations to selectively lock the handle attachment at the corresponding plurality of positions, and
- a first portion rotatable with rotation of the handle attachment, and
- a second portion including a housing and being non-rotatable while the first portion rotates, when the second portion is engaged to the mounting mechanism, and the second portion further including a shaft protruding from a bottom wall of an inner chamber of the housing and extending from the inner chamber to protrude through a spring having an end portion engaged with the indentation component that is located radially away from a longitudinal axis of the shaft, wherein the first portion includes an orifice to rotatably engage the shaft.

8. The method of claim 7, wherein the clutch mechanism includes a motor configured to reposition the handle attachment to an open position when the user is accessing the handle attachment and reposition the handle attachment to a closed position when the user is not accessing the handle attachment.

9. The computing machine of claim 2, wherein the first portion is rotatable with respect to the second portion as the handle attachment slides along the rails.

10. The method of claim 7, wherein the first portion includes the indentations, and the second portion includes the indentation component.

11. The computing machine of claim 1, wherein the clutch mechanism further includes a spring to bias the indentation component into a respective one of the indentations.

12. The method of claim 7, wherein the mounting mechanism comprises a rail along which the handle attachment is slideable.

13. The method of claim 12, wherein the first portion is rotatable with respect to the second portion as the handle attachment slides along the rail.

14. The method of claim 13, wherein the first portion includes the indentations, and the second portion includes the indentation component.

15. The method of claim 13, wherein the clutch mechanism further includes a spring to bias the indentation component into a respective one of the indentations.

16. An apparatus comprising:
a handle attachment;
mounting mechanisms configured to couple the handle attachment to a base of a machine; and
a clutch mechanism configured to rotate and selectively lock the handle attachment at a plurality of positions with respect to the machine, the clutch mechanism including:
- indentations corresponding to the plurality of positions,
- an indentation component engageable with the indentations to selectively lock the handle attachment at the corresponding plurality of positions, and
- a first portion rotatable with rotation of the handle attachment, and
- a second portion engaged to one of the mounting mechanisms and including a housing and being non-rotatable while the first portion rotates, and the second portion further including a shaft protruding from a bottom wall of an inner chamber of the housing and extending from the inner chamber to protrude through a spring having an end portion engaged with the indentation component that is located radially away from a longitudinal axis of the shaft,
wherein the first portion includes an orifice to rotatably engage the shaft.

17. The computing machine of claim 8, wherein the first portion includes the indentations, and the second portion includes the indentation component.

18. The computing machine of claim 1, wherein the housing has an outer surface with a flat side and an arcuate side, the flat side of the outer surface when engaged to the one of the first and the second end mounting mechanisms maintaining the second portion non-rotatable while the first portion rotates.

19. The computing machine of claim 1, wherein the clutch mechanism is a first clutch mechanism to engage the first end mounting mechanism, the computing machine further comprising a second clutch mechanism to engage the second end mounting mechanism.

20. The computing machine of claim 1, wherein the first portion has a housing separate from the housing of the second portion.

21. The computing machine of claim 1, wherein the shaft is non-rotatable while the first portion rotates.

* * * * *